United States Patent [19]

Bacon et al.

[11] Patent Number: 4,887,679
[45] Date of Patent: Dec. 19, 1989

[54] SELF-CLEANING WEIGHING HOPPER AND DRIVE MECHANISM

[75] Inventors: Forrest C. Bacon; Dale E. Pribbernow, both of Decatur, Ga.

[73] Assignee: Kliklok Corporation, Decatur, Ga.

[21] Appl. No.: 343,435

[22] Filed: Apr. 26, 1989

[51] Int. Cl.⁴ .................. G01G 23/00; G01G 19/00
[52] U.S. Cl. ................................. 177/245; 177/145
[58] Field of Search ............................. 177/245, 145

[56] References Cited

U.S. PATENT DOCUMENTS

| 4,478,300 | 10/1984 | Mikami . | |
|---|---|---|---|
| 4,566,549 | 1/1986 | Oshima | 177/245 |
| 4,688,654 | 8/1987 | Mosher et al. | 177/25.18 |
| 4,831,820 | 4/1989 | Edwards . | |

Primary Examiner—George H. Miller, Jr.
Attorney, Agent, or Firm—King & Schickli

[57] ABSTRACT

A self-cleaning weighing hopper to be used in a weighing apparatus is particularly adaptable for utilization with a sticky product. The hopper has two rotary doors containing a series of tined panels. One tined panel on each of the two doors extend toward each other so as to form a hopper bottom to hold a product charge. The panels on the two doors rotate in unison to release the weighed product charge into a receptacle. The hopper includes a comb scraper through which each tined panel rotates following release of the product charge. The comb scraper removes the sticky remnants of the product charge from the tines of the panels while the weighing apparatus is in operation. The doors are operated by a sliding arm in response to an actuator. A pin on the arm is guided by a spring/linkage mechanism along a slot on a guide plate and a stop is provided on the arm to insure proper actuation.

9 Claims, 3 Drawing Sheets

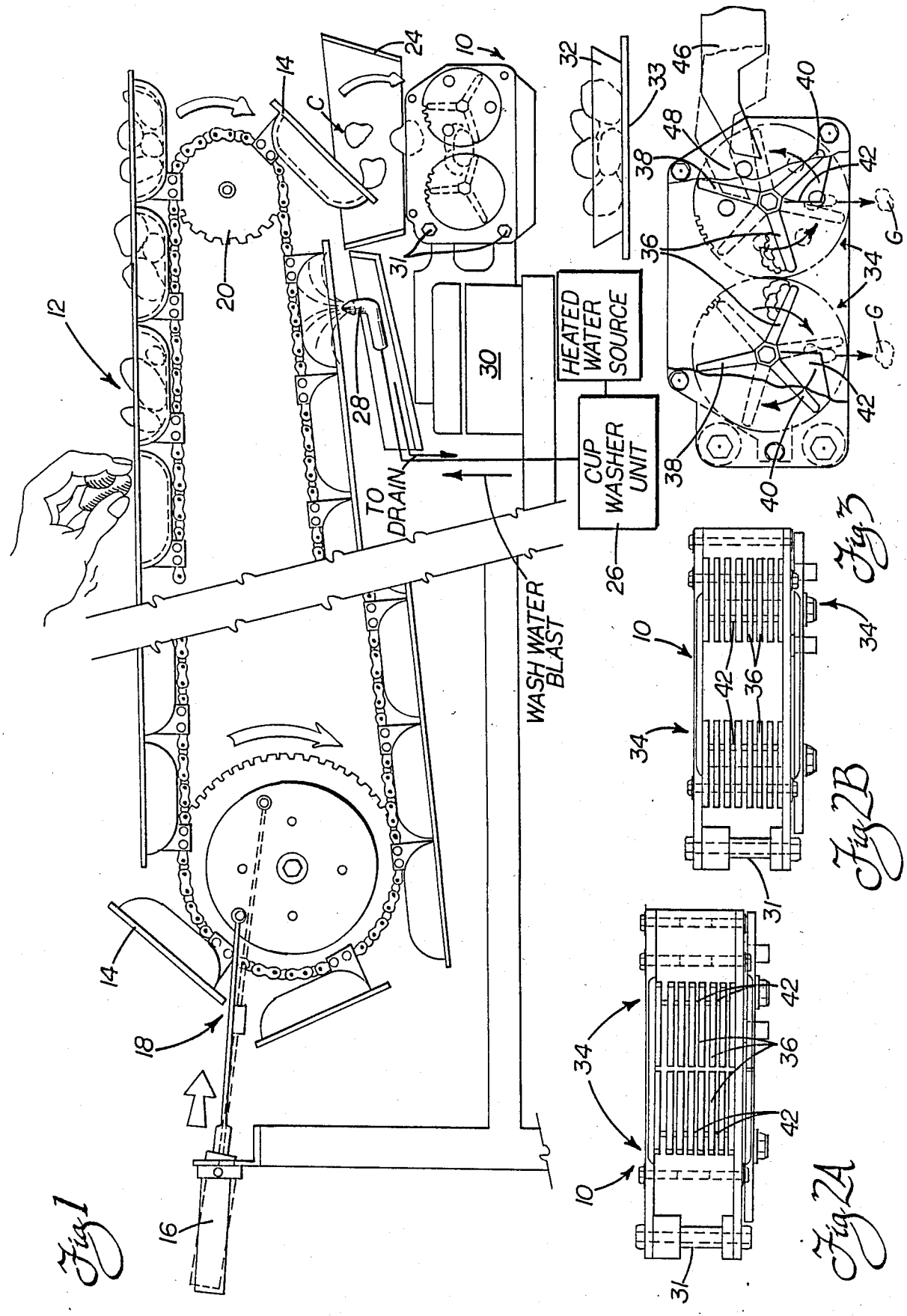

ically, to the field of weighing systems, and more particularly to a weighing hopper specially adapted for handling a sticky product wherein substantially all of the product remnants in the hopper following product discharge are removed during operation.

SELF-CLEANING WEIGHING HOPPER AND DRIVE MECHANISM

TECHNICAL FIELD

The present invention relates generally to the field of weighing systems, and more particularly to a weighing hopper specially adapted for handling a sticky product wherein substantially all of the product remnants in the hopper following product discharge are removed during operation.

BACKGROUND OF THE INVENTION

This invention concerns an improved weighing hopper for use generally with a combination weighing system. Such a combination weighing system is disclosed in U.S. patent application Ser. No. 126,915, filed Nov. 30, 1987, and entitled "Method and Apparatus for Linear Combination Weighing," now U.S. Pat. No. 4,821,820, issued Apr. 18, 1989.

This combination weighing system includes a series of in-line transfer conveyors. Each transfer conveyor includes a series of volumetric cups designed to receive and hold a product charge. A scale and associated weighing hopper are provided at the distal end of each transfer conveyor. Each transfer conveyor is advanced in stepped fashion so as to deliver a product charge from one volumetric cup at any single time to the associated weighing hopper. Once the product charge is delivered to the weighing hopper, the weight of the charge is registered by a control unit. The control unit scans various combinations of scales, calculates the total weight of product in the combinations and selects the first combination that falls within an acceptable range above the target weight. Individual product charges are then dumped from the selected weighing hoppers into waiting receptacles for subsequent handling.

The above-described combination weighing system can be specially adapted for use with a sticky product, such as beef cubes or other meat product. The weighing hoppers include two rotary doors, each containing a series of support panels. When support panels on the opposing rotary doors are extending toward each other, a product charge may be received and held within the weighing hopper. When a hopper is selected for discharge the rotary doors are actuated. As the associated support panels of the doors are rotated, the product charge is released into a waiting receptacle.

As should be appreciated, the continuous handling of a sticky product over a number of operating cycles results in a gradual increase in tallow and other product residue on the apparatus components. The combination weighing apparatus disclosed in the above-cited patent application addresses this problem. The apparatus is designed to provide minimal surface contact between the apparatus and product during handling and minimal product transfers throughout weighing and delivering operations. In addition, a liquid washing unit including a spray jet is provided to wash residue from the volumetric cups during system operation. Since this cleaning is completed during system operation, the need to shut the system down for this purpose is greatly reduced, and overall productivity is effectively increased. Furthermore, the above-described invention teaches the use of non-stick surfaces on all components which handle the product.

Despite the effective use of these expedients, it is desirable to further reduce the build-up of residue including tallow and other product matter within the weighing hopper.

More specifically, as the residue builds up over time it effects the accurate weighing of product charges. In particular, with each operating cycle, more and more of the measured product charge weight is actually the weight of the residue remaining in the hopper. This complicates the weighing process as unless a new tare weight is determined after each product discharge, the next product charge weight is increasingly inaccurate. Once product sticks to the hopper surfaces, more product sticks to that product and the inaccuracy accelerates geometrically. Eventually, the inaccuracy becomes so great so as to cause a significant reduction in the total weight of the actual product being delivered to a particular receptacle. This is particularly true since a number of product charges from different hoppers are used to make the target weight. Thus, the effect is further multiplied and a product weight well below the target weight may actually be delivered. This, of course, adversely effects the overall portion weight control quality of the product.

The sticky product residue also slows the flow of product from the hopper. This, of course, adversely effects the overall operating efficiency of the apparatus. In severe cases, it may even cause at least a portion of the product charge to be delivered so late as to not be directed into the desired receptacle. Further, once the tallow builds up to a sufficient weight, a glob of tallow may actually be delivered to a receptacle with the product charge. Both of these matters, of course, have a further undesirable effect on product quality.

A need is, therefore, identified to further reduce the build-up of residue including tallow in the weighing hopper. This advantageously should be accomplished continuously during the weighing and delivery operation to minimize system down time for cleaning. The concern must also be addressed without adversely affecting the ability of the weighing hopper to receive, accurately weigh and quickly discharge the handled product.

SUMMARY OF THE INVENTION

Accordingly, it is an object of the present invention to overcome the above-described limitations and disadvantages of the prior art.

Another object of the present invention is to provide a weighing hopper specially adapted for use with a sticky, difficult-to-handle product.

Still another object of the present invention is to provide a weighing hopper from which a build-up of product matter may be removed continuously during weighing system operation.

Another object of the invention to provide a weighing hopper that can be integrated into a combination weighing system to provide accurate weighing of a product charge and efficient handling and rapid discharge of a specialized product during continuous system operation.

Additional objects, advantages and other novel features of the invention will be set forth in part in the description which follows, and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects and in accordance with the purposes of the present invention as described herein, an improved weighing hopper is provided wherein residual product matter may be removed during continuous weighing system operation. The weighing hopper is provided with mounting rods designed to be received in receiving slots provided on an arm of a weighing scale. This allows for quick and easy attachment and removal of the weighing hopper from the weighing apparatus.

The weighing hopper includes two, cooperating rotary doors that provide a series of opposed radially extending, tined panels. A ram actuator is provided to actuate the rotary doors and release the product charge from a first pair of tined panels to a waiting receptacle while substantially simultaneously moving a second pair of tined panels in position to receive the next product charge for weighing. The two rotary doors include a pair of meshing gears to provide movement in unison.

The ram actuator is connected to an actuator arm including an actuating finger that engages a control pin on one of the gears. As that gear is turned, one of the rotary doors is rotated. Further, since that gear meshes with the other gear connected to the other rotary door, the other door is also rotated but in the opposite direction. In this way the doors are opened simultaneously from the inside out to provide smooth and efficient product discharge.

Preferably, the actuator arm includes a guide pin traveling within a groove in a guide plate. The guide pin engages the lower cam surface of the groove as the ram actuator is operated. This serves to control the movement of the arm so that the actuating finger at the end of the arm properly engages the control pin on the gear. Further, the arm includes a stop along its lower face so that the next set of rotary door panels are positively positioned to form the bottom of the hopper and receive the next product charge. More particularly, the next control pin on the gear engages the stop so as to prevent the panels from overrunning past the proper position.

As the ram actuator is operated to return the actuating finger to the home position and complete the operating cycle, a return spring biases the guide pin into engagement with the upper cam surface of the groove in the guide plate. As a result, movement of the arm is controlled so that the actuating finger is lifted over the control pin that engaged the stop. Thus, the rotary doors are not moved during the return portion of the operating cycle.

Advantageously, the tined panels provided on the rotary doors of the present hopper combine the dual features of providing support for holding product charges within the weighing hopper and surface characteristics specially adapted for cleaning during continuous weighing system operation.

Preferably, the tined panels pass through a comb scraper during rotation following product discharge. The comb scraper includes scraping blades dimensioned so as to pass between the tines while making sufficient contact with the tines to provide cleaning action. Thus, the comb scraper removes product residue, including tallow and other matter, which remains on the tined panels after the product charge is weighed and released to the underlying receptacle. Advantageously, this cleaning operation provides for more efficient and accurate weighing during continuous and extended weighing system operation and eliminates a substantial portion of system cleaning down time.

Still other objects of the present invention will become readily apparent to those skilled in this art from the following description wherein there is shown and described a preferred embodiment of this invention simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification illustrates several aspects of the present invention and together with the description serves to explain the principles of the invention. In the drawing:

FIG. 1 is a side elevational view showing a combination weighing system of the type in which the present weighing hopper invention may be utilized. This figure demonstrates the manual charging of the volumetric cups, the delivery of the product charge from a volumetric cup into the weighing hopper and the washing of a volumetric cup as the transfer conveyor is advanced one step;

FIG. 2A is a plan view showing the two cooperating rotary doors of the weighing hopper closed;

FIG. 2B is a view similar to FIG. 2A showing the double rotary door of the weighing hopper open;

FIG. 3 is a side elevational view showing the operation of the comb scraper as the rotary doors rotate through a portion of a complete cycle;

Figure 4A:
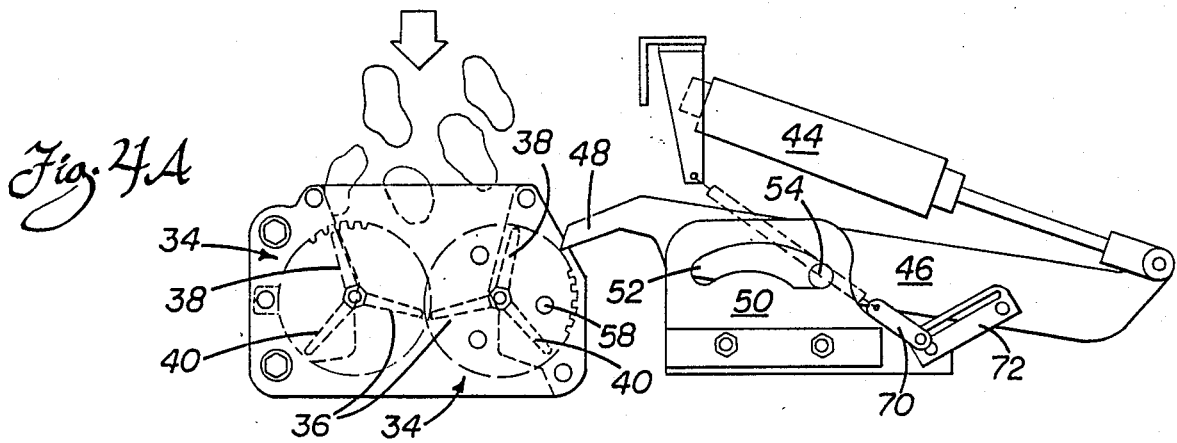
FIGS. 4A-4D are side elevational views showing the operation of the ram actuator and rotary doors of the weighing hoppers of the present invention.

Reference will now be made in detail to the present preferred embodiment, an example of which is illustrated in the accompanying drawing.

DETAILED DESCRIPTION OF THE INVENTION

Reference is now made to FIG. 1 showing the weighing hopper 10 mounted for operation within a combination weighing system. For a more detailed description of the combination weighing apparatus as partially depicted in FIG. 1, reference is made to U.S. patent mentioned above, the disclosure of which is incorporated herein by reference. The weighing hopper 10 is specially designed for use in association with the combination weighing apparatus to handle a sticky product such as beef cubes or tips.

As should be appreciated from viewing FIG. 1, a transfer conveyor 12 is advanced in stepped fashion, one volumetric cup 14 at a time, by means of a ram actuator 16 and a drive system generally designated as 18. As a volumetric cup 14 is rotated over the idler sprocket 20 at the distal end of the transfer conveyor 12 into a product releasing position, a product charge C is released and falls freely through a guide collar 24 into the underlying weighing hopper 10. Following release of the product charge C, the volumetric cup 14 travels to a cup washer unit 26 which includes a spray jet 28. The spray jet 28 directs heated water under pressure to the entire surface of the volumetric cup 14, washing product residue from the volumetric cup 14 during system operation.

Upon delivery of the product charge C to the weighing hopper 10, the weight of the charge is measured by the corresponding scale 30 to which the hopper is attached by means of mounting rods 31. When the product charge C is subsequently selected for release so as to meet a target weight, the weighing hopper 10 dumps the product charge C to a waiting receptacle 32. A conveyor 33 then conveys the receptacle 32 and product charge C towards further processing.

One problem with handling a sticky product such as beef cubes is that residual product matter from previously weighed product charges tends to build up over time on the surfaces of the weighing hopper 10. As described above, this can effect the accuracy of the weight measurement of subsequent product charges. More particularly, it should be appreciated that unless a new tare weight is determined after each release of product charge C from the hopper 10 (a step that significantly slows operating efficiency), an increasing percentage of the next measured charge weight actually comprises the sticky residue and tallow. This inaccuracy can increase geometrically, as pointed out above. Over time, smaller and smaller weight portions of beef cubes are properly delivered to the receptacles from the hopper. As a result, both product quality and consumer satisfaction suffer. It should also be appreciated that the sticky product residue may slow the release of product from the weighing hopper 10, thereby reducing the operating efficiency of the combination weighing apparatus.

One method of dealing with this problem is described in the above-cited patent and involves the use of a non-stick material for all surfaces contacted by the product. Such a material as sold by Dupont deNemours under the trademark, Teflon, may be used. While the use of such a passive non-stick surface does aid in the prevention of build-up of product residue, it does not alleviate the problem to the extent necessary for maximum operating efficiency when handling certain products. The improved design of the present invention provides an additional feature for positively removing product residue from the weighing hopper 10.

As shown in FIGS. 2A, 2B and 3, the weighing hopper 10 includes two rotary doors, generally designated as 34. The doors 34 include three pairs of radially extending, cooperating panels 36, 38 and 40. Each of the cooperating panels 36, 38, 40 of the rotary doors 34 have a tined design. As described in greater detail below, during the rotating cycle of the panels 36, 38, 40, they interdigitatingly engage a comb scraper 42 formed, for example, of molded nylon. The positive scraping action removes product residue G from the tined panels (see FIG. 3).

As best shown in FIGS. 4A-4D and 5, actuation of the rotary doors 34 is accomplished by means of a ram actuator 44 that is pivotally connected to an actuating arm 46 including an actuating finger 48. Directional movement of the actuating arm 46 is controlled by a guide plate 50 having a groove 52. Groove 52 receives a guide pin 54 attached to the 15 actuating arm 46. As the ram actuator 44 is retracted, as shown by the action arrow B in FIGS. 4B-4D, the guide pin 54 engages the lower cam surface 56 of the groove 52. Thus, the movement of the actuating arm 46 is controlled so that the actuating finger 48 properly engages the control pin 58 attached to gear 60 of one rotary door 34. Gear 60 meshes with a cooperating gear 62 on the other door 34 so that the cooperating panels 36, 38, 40 move in unison. As the rotary door 34 moves as shown by the action arrows D in FIGS. 4C-4D, the Cooperating panels 36 rotate to an open position (shown in FIGS. 2B and 4C) and the product charge C is dumped from the weighing hopper 10.

Figure 4B:
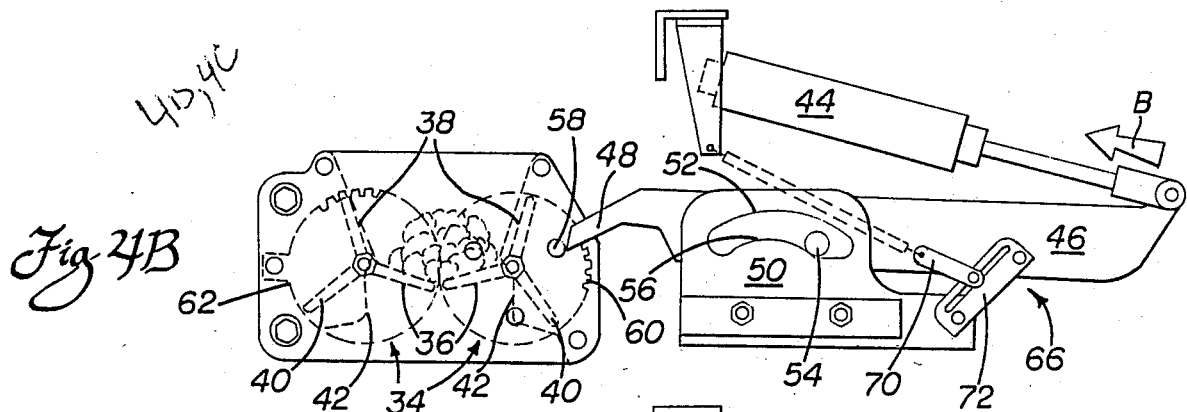
Figure 4C:
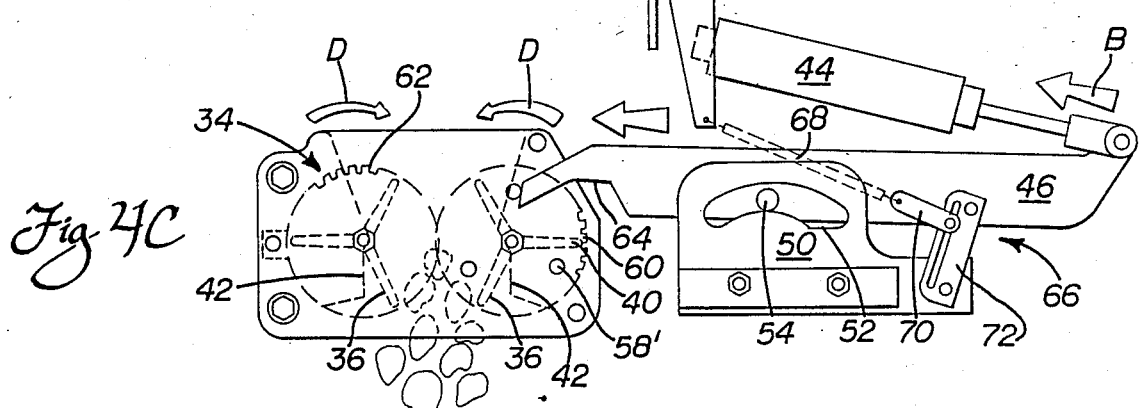
Figure 4D:
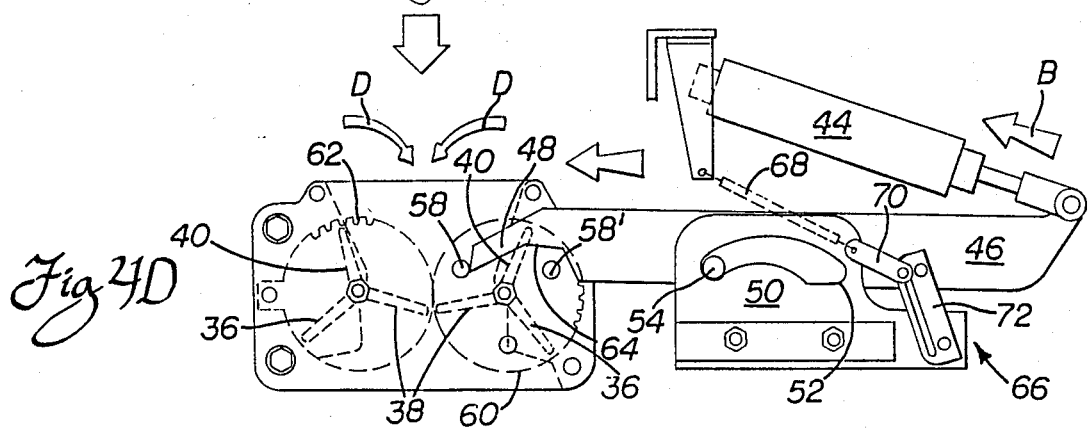
Figure 5:
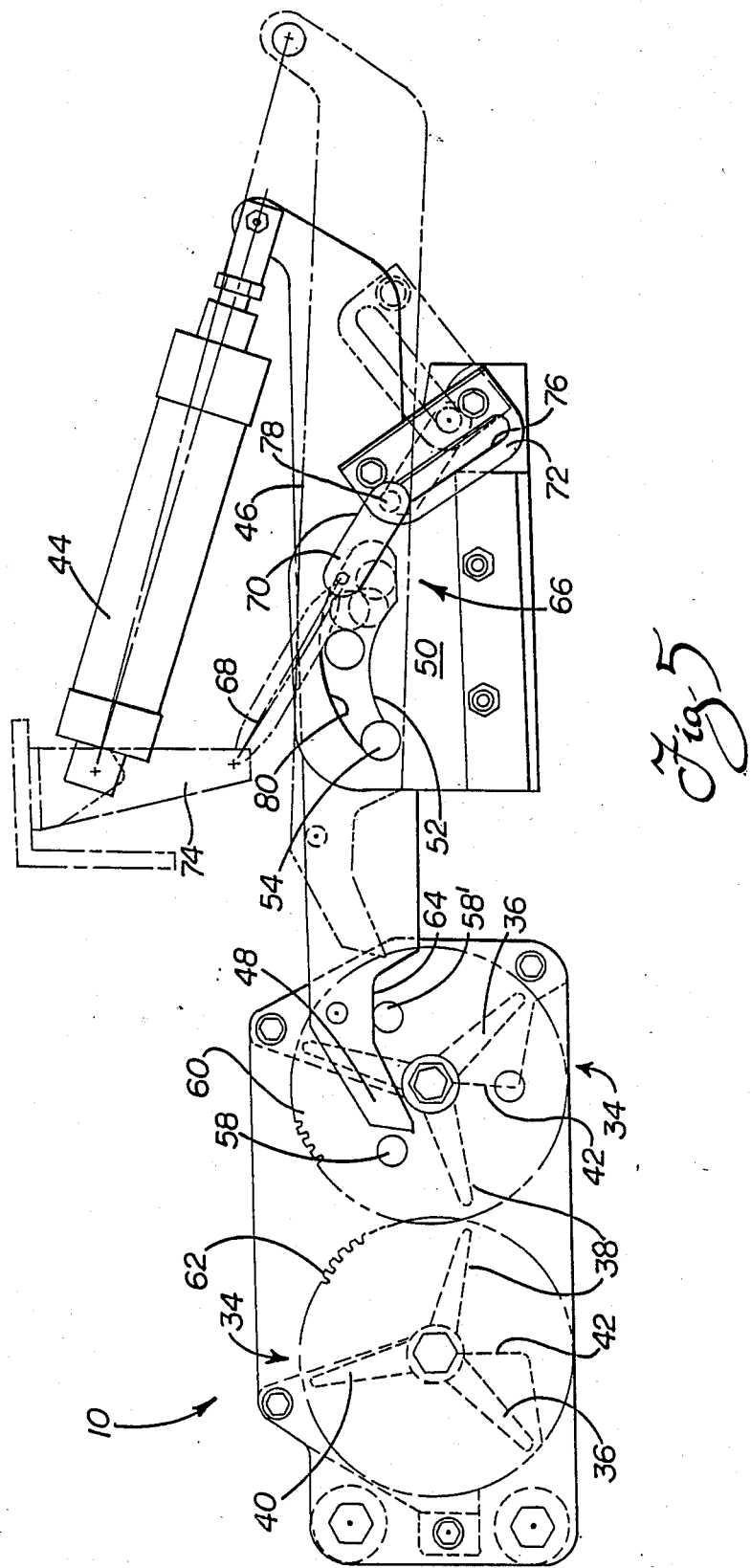
FIG. 5 is an enlarged side elevational view showing the various positions of the guide pin traveling along the camming surfaces of the groove in the guide plate during the cycling of the rotary doors of the hopper.

As shown in FIGS. 4D and 5, as the ram actuator 46 is fully retracted, the second pair of cooperating panels 38, moving simultaneously with the first pair of cooperating panels 36, are brought into a closed position to receive the next product charge C from the transfer conveyor 12. In addition, the third pair of panels 40 are moved into position to form the end walls of the hopper 10. Further, these panels 40 are oriented so as to converge toward their bottom and thereby direct any product downwardly toward the middle of the panels 38 now forming the bottom of the hopper 10.

The exact positioning of the panels 36, 38 and 40 is assured by means of a stop 64 formed by a lower edge of the arm 46. More specifically, as the doors 34 are rotated, the next control pin 58' moves upwardly in an arc until it engages the stop 64 (at or just beyond the full range of actuator retraction), thereby positively setting the panels in proper position for receiving the next product charge. Following this, the ram actuator 44 is then re-extended with the actuating finger 48 of the actuating arm 46 being positively guided over the newly positioned control pin 58' so as to be in position to repeat the operating cycle.

More specifically, the return action of the arm 46 by the ram actuator 44 is assisted by a spring/linkage mechanism, generally designated as 66 (see also FIG. 5). The spring/linkage mechanism 66 includes a return spring 68, a connecting link 70 and a pivoting link plate 72. As shown, the return spring 68 is connected between the connecting link 70 and a bracket 74 on the machine frame. The link plate 72 is pivotally secured to the actuating arm 46 and is also pivotally attached to the guide plate 50. The link plate 72 includes an elongated slot 76. The elongated slot 76 receives a sliding pin 78 attached to the connecting link 70.

As the ram actuator 44 is re-extended to return the actuating finger 48 from the full line to the phantom-lined home position (FIG. 5) and complete the operating cycle, the return spring 68 biases the guide pin 54 into engagement with the upper cam surface 80 of the groove 52. Thus, the arm 46 is guided so as to raise the actuating finger 48 of the actuating arm 46 up and over the next control pin 58' during the return portion of the operating cycle. In this way the rotary doors 34 remain stationary as the ram actuator 44 is recycled and the actuating arm 46 returned to its home position.

Following the delivery of the product charge C as shown in FIG. 4C, the tined panels 36 are advantageously rotated through the comb scraper 42. The scraping blades of the comb scraper 42 are dimensioned so as to pass, in an interdigitating manner between individual tines of the panels 36, 38, 40 along substantially the full length. The scraper blades are also sufficiently rigid and of such a width as to make scraping contact with the tines so as to substantially completely remove product residue. The resulting residue G scraped from the tines on each cycle falls harmlessly from the comb scrapers 42 into an underlying receptacle 32.

Because of the unique design of the hopper 10, including the comb scrapers 42, a number of distinct advantages that significantly improve the overall operating efficiency of a weighing apparatus are provided. When one pair of panels 36 forms the bottom of the hopper 10, the next pair of panels (40 as shown in FIG. 4B) in combination with the scrapers 42 effectively forms the end walls of the hopper. Thus, the product charges C are quickly and efficiently deflected to the bottom for weighing. In addition, these end walls formed by the panels 36, 38 and 40 of the rotary doors 34 are subjected to a positive cleaning action on each cycle by passing in interdigitating fashion through the comb scraper 42. As such, residue is also effectively cleaned from these components. Consequently, the build-up of tallow and residue in the hopper 10 is substantially prevented. Furthermore, a substantially constant tare weight is maintained and the need to reconfirm the tare weight after each cycle to obtain an accurate product weight is reduced. As such, machine operating efficiency is increased.

In summary, numerous benefits result from the use of the present invention. The weighing hopper 10 is specially adapted to weigh and deliver a product charge that is sticky and difficult to handle. The tined cooperating panels 36, 38 and 40 are designed to hold a product charge C for weighing when the weighing hopper 10 is in the closed position. During the rotating cycle of the rotary doors 34, these panels 36, 38, 40 interdigitatingly engage the comb scrapers 42 which remove the product residue. This serves to eliminate product build-up within the weighing hopper 10, resulting in the most accurate weighing possible during continuous system operation. In addition to the operating efficiency being enhanced, the need for system down time for major cleaning is substantially reduced.

The foregoing description of the preferred embodiment of the invention has been presented for purposes of illustration and description. It is not intended to be exhaustive or to limit the invention to the precise form disclosed. Obvious modifications or variations are possible in light of the above teachings. For instance, provision may be made for a cleaning spray to be applied to the tined panels to further remove residual particles of product matter. The preferred embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A self-cleaning weighing hopper for use in a weighing apparatus for sticky products or the like comprising:
   side walls defining said hopper;
   at least one panel extending across said hopper and forming the bottom thereof; and
   means for cleaning said panel of the product during operation of the hopper.

2. The self-cleaning weighing hopper set forth in claim 1, wherein said panel includes spaced tines and said cleaning means includes a comb scraper for engaging said tines in interdigitating fashion and removing substantially all of the product during release of said product.

3. The self-cleaning weighing hopper set forth in claim 2, wherein said cleaning means includes means for moving said panel and said comb scraper relative to each other, to assure release of substantially all of said product.

4. The weighing hopper set forth in claim 3, wherein said panel comprises a rotary door and said weighing hopper further includes drive means to actuate said door to dump the product from said tined panel, and at least a second tined panel that moves substantially simultaneously to receive a subsequent product charge for weighing.

5. The weighing hopper set forth in claim 4, wherein is provided a second rotary door including a second tined panel in opposed relation to said first rotary door, said tined panel of said first and second rotary doors forming a double door to form the bottom of said hopper, said moving means providing opposed unison movement to said rotary doors.

6. The weighing hopper set forth in claim 5, wherein said moving means for movement of said doors includes a pair of meshing gears connected to said rotary doors and a ram actuator, said ram actuator having an arm for engaging a control pin on one of said gears so as to provide movement of said rotary doors.

7. The weighing hopper set forth in claim 6, wherein said arm includes a guide pin that engages and travels along a groove in a guide plate so as to direct arm movement.

8. The weighing hopper set forth in claim 7, wherein said arm movement is further aided by a spring mechanism, said spring mechanism including a link plate having a first end fixed to said actuating arm, a second end pivotally attached to said guide plate and an elongated slot; a connecting link having a first and second end, said first end of said connecting link having a pin slidably engaging said elongated slot on said link plate; and a spring having a first end attached to said second end of said connecting link, the action of said spring causing said guide pin to travel along the upper surface of said groove during return motion of said operating arm.

9. The weighing hopper set forth in claim 6, wherein said arm also includes a stop means for engaging a second control pin on one of said gears so as to provide positive control to stop rotation of said rotary doors.

* * * * *